(12) United States Patent
Kinstler

(10) Patent No.: US 6,831,926 B1
(45) Date of Patent: Dec. 14, 2004

(54) LEGACY SIGNALS DATABUS ADAPTER/COUPLER

(75) Inventor: Gary A. Kinstler, Torrance, CA (US)

(73) Assignee: The Boeing Company, Seal Beach, CA (US)

( * ) Notice: Subject to any disclaimer, the term of this patent is extended or adjusted under 35 U.S.C. 154(b) by 709 days.

(21) Appl. No.: 09/697,862

(22) Filed: Oct. 27, 2000

(51) Int. Cl.$^7$ .............................. H04J 3/16; H04J 3/22
(52) U.S. Cl. ........................... 370/467; 370/538
(58) Field of Search .................... 370/465, 466, 370/535, 538, 419, 467

(56) References Cited

U.S. PATENT DOCUMENTS

| | | | |
|---|---|---|---|
| 4,737,950 A | 4/1988 | Fechalos | 370/56 |
| 4,935,868 A | 6/1990 | DuLac | 364/200 |
| 5,287,528 A | 2/1994 | Canik et al. | 395/800 |
| 5,315,706 A | 5/1994 | Thomson et al. | 395/200 |
| 5,509,126 A | 4/1996 | Oprescu et al. | 395/307 |
| 5,572,684 A | 11/1996 | Canik et al. | 395/286 |
| 5,612,953 A * | 3/1997 | Olnowich | 370/367 |
| 5,875,313 A | 2/1999 | Sescila, III et al. | 395/309 |
| 5,953,511 A | 9/1999 | Sescila, III et al. | 395/309 |
| 6,057,949 A | 5/2000 | Kinstler | 359/164 |
| 6,169,746 B1 * | 1/2001 | Ueda et al. | 370/466 |
| 6,202,103 B1 * | 3/2001 | Vonbank et al. | 710/15 |
| 6,233,253 B1 * | 5/2001 | Settle et al. | 370/474 |
| 6,483,849 B1 * | 11/2002 | Bray et al. | 370/465 |
| 6,505,255 B1 * | 1/2003 | Akatsu et al. | 709/239 |
| 6,513,085 B1 * | 1/2003 | Gugel et al. | 710/305 |
| 6,515,987 B1 * | 2/2003 | Carrozza et al. | 370/366 |
| 6,519,544 B1 * | 2/2003 | Deguchi et al. | 702/117 |
| 6,697,375 B1 * | 2/2004 | Meng | 370/465 |
| 2003/0134590 A1 * | 7/2003 | Suda et al. | 455/3.06 |

* cited by examiner

*Primary Examiner*—Ajit Patel
*Assistant Examiner*—Chirag Shah
(74) *Attorney, Agent, or Firm*—Sonnenschein Nath & Rosenthal LLP

(57) ABSTRACT

The adapter/coupler links at least one legacy signal to a wideband network having a defined protocol. The adapter/coupler may be used with a wideband network having a signaling speed of 90 megabits per second, or greater. The adapter/coupler includes a signal conversion/conditioning element for receiving at least one legacy signal and providing a conditioned digital signal which is compatible to the defined protocol of the wideband network. A low latency controller element receives the conditioned digital signal and provides data/control signals. A link/physical layer element receives the data/control signals and transforms them to appropriate signaling mechanisms of a defined physical layer standard in accordance with the defined protocol. The transformed signals are outputted to the wideband network. The latency from the reception of the conditioned digital signal from the signal conversion/conditioning element to the output of the transformed signals to the wideband network is less than 200 microseconds. The adapter/coupler of the present invention introduces a wide bandwidth transmission capability to accommodate the needs of present day and future systems.

19 Claims, 3 Drawing Sheets

LEGACY SIGNALS DATABUS ADAPTER/COUPLER

BACKGROUND OF THE INVENTION

1. Field of the Invention

The present invention relates to the linking of legacy signals to wideband networks and more particularly to an adapter/coupler, which utilizes low latency techniques and the inherent features of selected industry open standard network protocols.

2. Description of the Related Art

Modem electronics and avionics systems rely on a variety of signal interconnection techniques and methods to communicate necessary information between elements of the system. These techniques and methods rely on information protocols and physical layer transmission media suitable to the transmission of the necessary information and have often evolved into and been documented as industry communications standards.

The earliest and simplest methods were of low bandwidth point-to-point and multi-drop type connections such as single-ended and differential discretes, serial data protocols such as RS-232/422/485, which commonly work up to approximately 112 Kbps, and in some synchronous versions up to 1–10 Mbps, as well as moderate speed bus-based multiple node networks such as MIL-STD-1553, which operates at a speed of 1 Mbps. Many of these, in their original form, were developed as long as 30–40 years ago. These formats and methods are termed here as "legacy" signals.

More recent buses, developed within the last decade, include ones such as the IEEE-1394 standard (Firewire) and Fibre channel. These latter buses operate at speeds about two or three order of magnitude higher (currently 400 to 800 Mbps, or higher) than the legacy signals, and are accordingly classified as wideband networks.

The proliferation of interconnection methodologies accumulated over the years, and the tendency of manufactures of electronics products to design to the more common earlier legacy signal standards, has led to a situation where many different connection and bus types are simultaneously present in modern complex electronics systems. Each of these legacy signal types typically require their own set of dedicated wiring between sources and destinations, some extending considerable lengths throughout a vehicle system, adding weight and cost to finished system products.

Prior art describes the use of remote terminals to interface legacy signal types to higher bandwidth master buses. Such techniques rely on storing incoming and outgoing data from the remote terminal in buffers for transmission at convenient intervals, thereby introducing significant time latency to signals passed. These latencies require the remote terminal to first satisfy all of the signal passing handshaking required by an originating legacy signal. The data is then passed over the wideband network bus, and a new legacy signal message is created at the destination with a separate handshake transaction to complete the transfer. This process essentially breaks each message into two separately negotiated message components, each with potentially significant delays. Such delays can be critical for control systems which depend on low data latencies for stable feedback loop closures.

OBJECTS AND SUMMARY OF THE INVENTION

It is therefore a principal object of the present invention to provide a single network type for transporting data from all nodes in a system, including interfacing with legacy signal types.

It is another object to accomplish such data transportation with low latency to support the objectives of high bandwidth control systems loop closures.

It is another object to transfer timing information between network nodes with a low degree of data latency variability, i.e., jitter.

It is yet another object to accomplish the above while minimizing power consumption to implement the wideband network.

It is a further object to lower the overall total weight and cost of system signal interconnects in complex modern avionics and electrical systems.

These and other objects are accomplished by the adapter/coupler of the present invention, which links at least one legacy signal to a wideband network having a defined protocol. The adapter/coupler may be used with a wideband network having a signaling speed of 90 megabits per second, or greater. The adapter/coupler includes a signal conversion/conditioning element for receiving at least one legacy signal and providing a conditioned digital signal which is compatible to the defined protocol of the wideband network. A low latency controller element receives the conditioned digital signal and provides data/control signals. A link/physical layer element receives the data/control signals and transforms them to appropriate signaling mechanisms of a defined physical layer standard in accordance with the defined protocol. The transformed signals are outputted to the wideband network. The latency from the reception of the conditioned digital signal from the signal conversion/conditioning element to the output of the transformed signals to the wideband network is less than 200 microseconds. The adapter/coupler of the present invention introduces a wide bandwidth transmission capability to accommodate the needs of present day and future systems.

In a preferred embodiment the present invention utilizes the IEEE 1394.a standard. This provides the lowest operating power in the wideband network class and the most efficient protocol for accommodating simultaneous asynchronous and isochronous data transmission.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
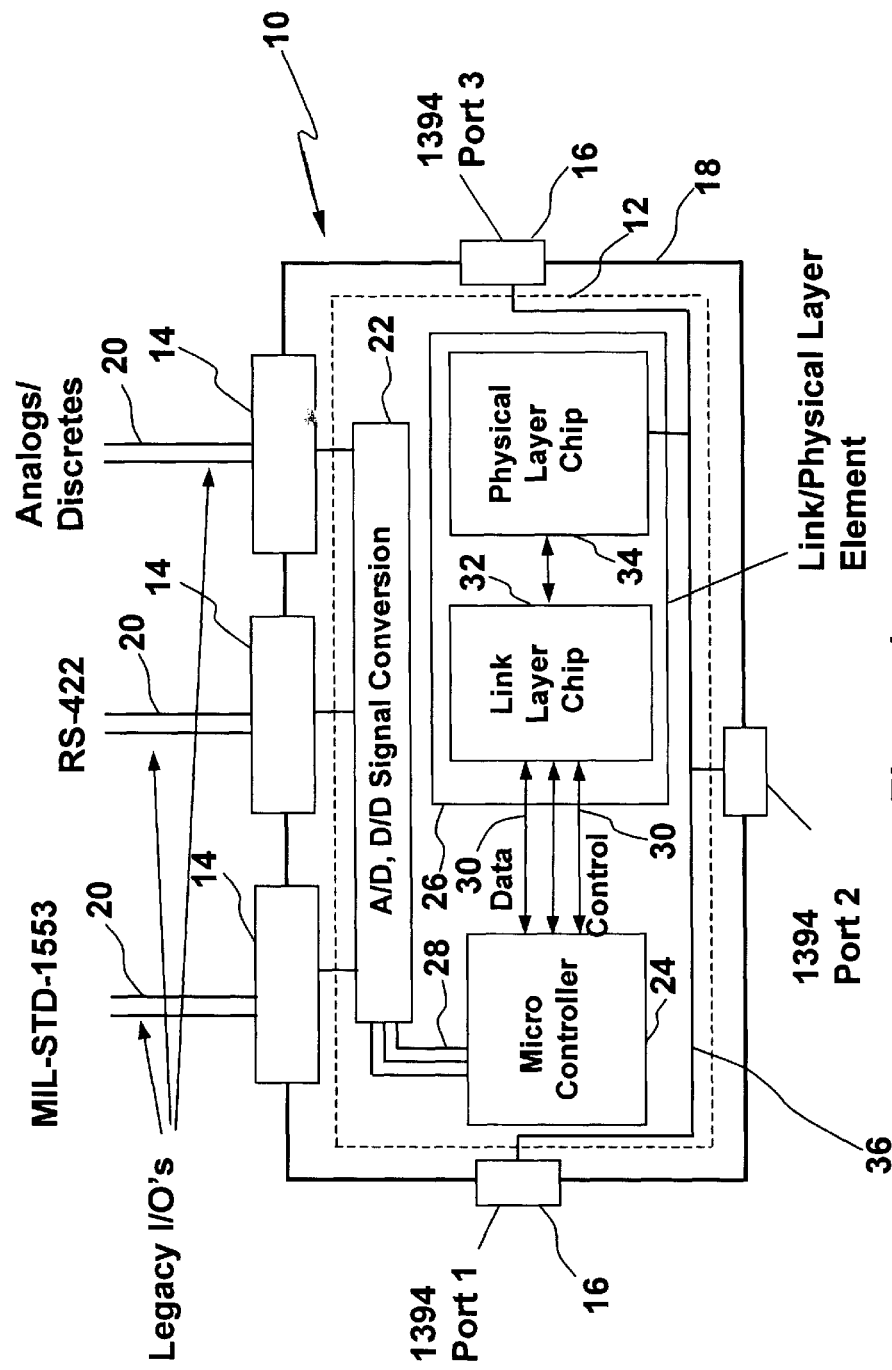
FIG. 1 is a block diagram of an adapter/coupler assembly of the present invention.

Referring now to the drawings and the characters of reference marked thereon, FIG. 1 illustrates a preferred embodiment of the adapter/coupler assembly of the present invention, designated generally as 10. The adapter/coupler assembly 10 includes an adapter/coupler, designated generally as 12; at least one legacy signal connector 14; at least one wideband network connector 16; and, a housing 18.

The adapter/coupler 12 is for linking the legacy signals 20 to a wideband network (not shown in FIG. 1), which has a defined protocol. The wideband network has a signaling speed of 90 megabits per second or greater. The adapter/coupler 12 includes a signal conversion/conditioning element 22, a low latency controller element 24, and a link/physical layer element 26.

FIG. 1 shows three legacy signal connectors 14 for the purposes of illustration; however, it is understood that there may be as few as one legacy signal connector 14 and as few as one signal type 20. The signal types may include discretes, continuous analogs, and various serial digital formats. Examples of serial digital formats include RS-422/232 MIL-STD-1553, and ARINC formats. The legacy signal connectors 14 may be typical commercially available connectors such as DB-9 or DB-25, or aircraft type connectors for signals formatted as ARINC or MIL-STD-1553.

A signal conversion/conditioning element 22 receives the legacy signals 20 from the legacy signal connectors 14 and provides a conditioned digital signal 28, which is compatible to a defined protocol of the wideband network being linked. The signal conversion/conditioning element 22 converts continuous analog signals into digital numbers representative of the signal magnitude and polarity in a continuously repeating manner. These numerical representations are deemed data samples. The numerical representation of these data samples is accomplished in binary-coded decimal format. The signal conversion/conditioning element 22 may also accept discrete signals of varying voltage levels, or external circuit characteristics, such as switch closures. The various discrete signals are converted to a common digital representation at electrical levels consistent with the input to the controller element 24, e.g., micro-controller. This process is accomplished in a repetitive fashion similar to analog signal sampling. For serial digital data types, the purpose of the signal conversion/conditioning element 22 is to translate the electrical levels of the legacy signal 22 into a common electrical level consistent with the micro-controller 24 input.

The low latency controller element 24 receives reconditioned digital signals 28 and provides data/control signals 30. The low latency controller element 24 is preferably a micro-controller. It is preferably a low-power, high-speed element, such as Texas Instruments MSP430F112. The low latency controller element 24 may be commercially available, or an application specific integrated circuit. Low latency is achieved by poling the discrete inputs received from the signal conversion/conditioning element 22 at a rapid repetitive rate, which is a small fraction of the total access time to the wideband network. In a typical wideband network based upon the IEEE 1394 standard, there are approximately 8,000 accesses per second. This access repetition rate (viz., 8,000 accesses per second) is equivalent to a repetitive access period of 125 microseconds. Serial digital data is continuously sensed and converted into data words for transmission to the link/physical layer element 26. Analog data, which has been converted to digital format, is passed to the link/physical layer element 26 at the repetitive rate of the analog to digital conversion process. In using other wideband interface standards, a similar high rate of access should be implemented with supporting input/output scheduling algorithms, which are not otherwise inherent in the protocol. In all implementations of the present invention, the latency from the reception of the conditioned digital signal from the signal conversion/conditioning element 22 to the output of the transformed signals to the wideband network is less than 200 microseconds.

The low latency controller element 24 may typically include software for accomplishing the poling and digital data formatting tasks. Also, the presence of serial digital data may be sensed with an interrupt-driven input to the micro-controller 24, which functions to initiate appropriate software tasks to capture the incoming serial digital signal. In an ASIC implementation the equivalent software functions may be implemented in firmware microcircuit design.

Under either software or firmware control the low latency controller element 24 includes a jitter synchronization element for providing a variability of data latency (i.e., jitter) of less than ±1 microsecond from the reception of conditioned digital signal 28 from the signal conversion/conditioning element 22 to the output of the transformed signals from the link/physical layer element 26 to the wideband network.

The link/physical layer element receives the data/control signals 30 and transforms them to appropriate signal mechanisms of a defined physical layer standard in accordance with the defined protocol of the wideband network.

The link/physical layer standard, in its preferred embodiment is based upon the industry standard IEEE-1394, including its derivatives. The original version of the IEEE1394 Standard was approved in 1995. Upgrades to this Standard, known as the ".a" supplement was approved in the year 2000, which provides improved protocol efficiencies for the derivatives. The IEEE-1394 standard continues to evolve toward an ultimate signaling speed of 3.2 Gbps, extension of maximum cable lengths beyond 15 feet, introduction of a fiber optic physical layer cabling media, and features for accomplishing bridging between separate IEEE-1394 busses of the same or different speeds.

Alternative wideband network implementations might be based upon other industry standards such as fibre channel. It is understood that this technique may be implemented with other wideband network standards.

The link/physical layer element 26 preferably includes a link layer controller element 32 for receiving the data/control signals 30 and packaging the data to be transmitted into packets with appropriate destination, typing and error detection coding. The link layer controller element 32 is typically an ASIC. An example may be a Texas Instrument TSB12LV01A.

A physical layer arbiter element 34 is connected to the link layer controller element 32 for transmitting the packets in the form of transformed signals to the wideband network after arbitrating for, and successfully gaining access to, the wideband network. The transmitted signals 36 from the link/physical layer element 26 comprise information about the legacy signal raw waveform or the serial digital data contained therein. These transmitted signals 36 may be transmitted, typically, on one or two wire pairs, or a single fiber optic fiber. The physical layer arbiter element 34 may typically be constructed from an ASIC which supports 1, 2, 3, 4 or 6 ports, utilizing, for example, ASICs from Texas Instruments, part numbers TSB41LV01, TSB41LV02A, TSB41 LV03A, TSB41 LV04A, and TSB41 LV06A.

The adapter/coupler 12 implements the capability to transform legacy signals, i.e., placing onto and taking off of the wideband network. In the reverse direction, it is receiving information packets from the wideband network and translating them into their intended legacy format. Wideband network signals are received by the physical layer arbiter element 34 and transmitted to the link layer controller element 32 for transmission to the low latency controller element 24. In this reverse direction the resulting data/control signals 30 from the link/physical layer element 26 are passed to the low latency controller element 24 and then conditioned by the signal conversion/conditioning element 22 for a conversion to a legacy signal.

Power for the adapter/coupler assembly 10 may be obtained either from an additional pair of wires contained within the same cable containing the signaling wires, or may be derived from the equipment from where the legacy signals originate. Accordingly, the connector may contain connections for multiple wire pairs to accommodate signal data and power. Fiber optic based physical layer media may contain only fiber optic interfaces without any power.

The link layer controller element 32 and the physical layer arbiter element 34 are preferably galvanically isolated to prevent any significant current flow therebetween. The purpose of this galvanic isolation is to eliminate ground loops between equipment connected at the various nodes of the wideband network.

Figure 2:
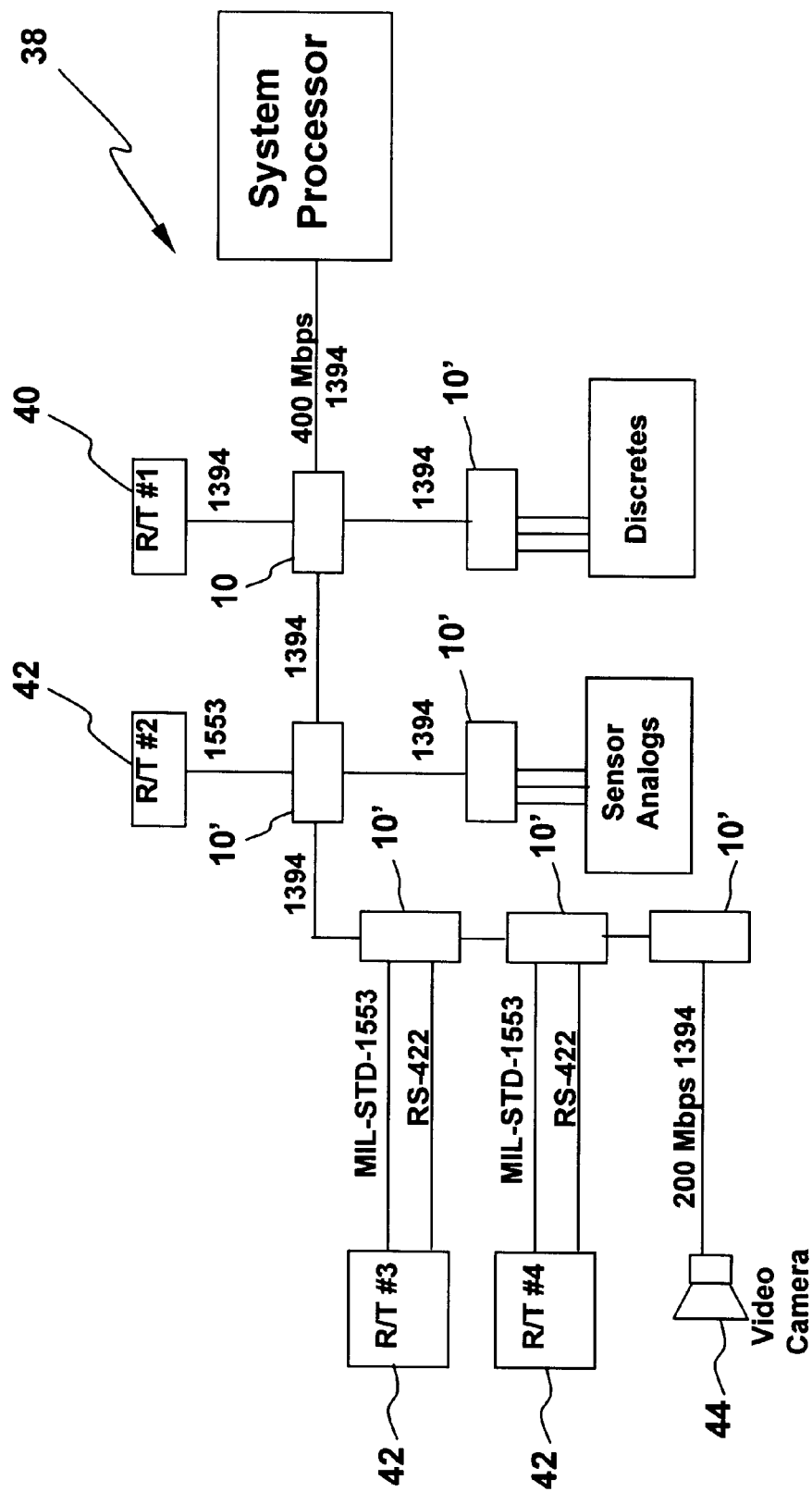
FIG. 2 is a block diagram showing the implementation of a number of the adapter/coupler assemblies in a multi-node network system.

Referring now to FIG. 2, a number of adapter/coupler assemblies 10 are shown implemented in a multi-node network system, designated generally as 38. This figure shows how adapter/coupler assemblies 10, 10' can perform different functions. One function, denoted by assembly 10, may be to interface only 1394 compatible nodes to the rest of the 1394 bus network. (This function is typically known as a branching node.) Another function, denoted by assemblies 10', is to interface one or more legacy signals to the 1394 bus network. Remote terminals (R/T's) may be directly 1394 compatible, as denoted by number designation 40, or of a type that interfaces with only legacy type signals, as shown by numeral designation 42. Peripheral device 44 is directly compatible with the 1394 bus.

Figure 3:
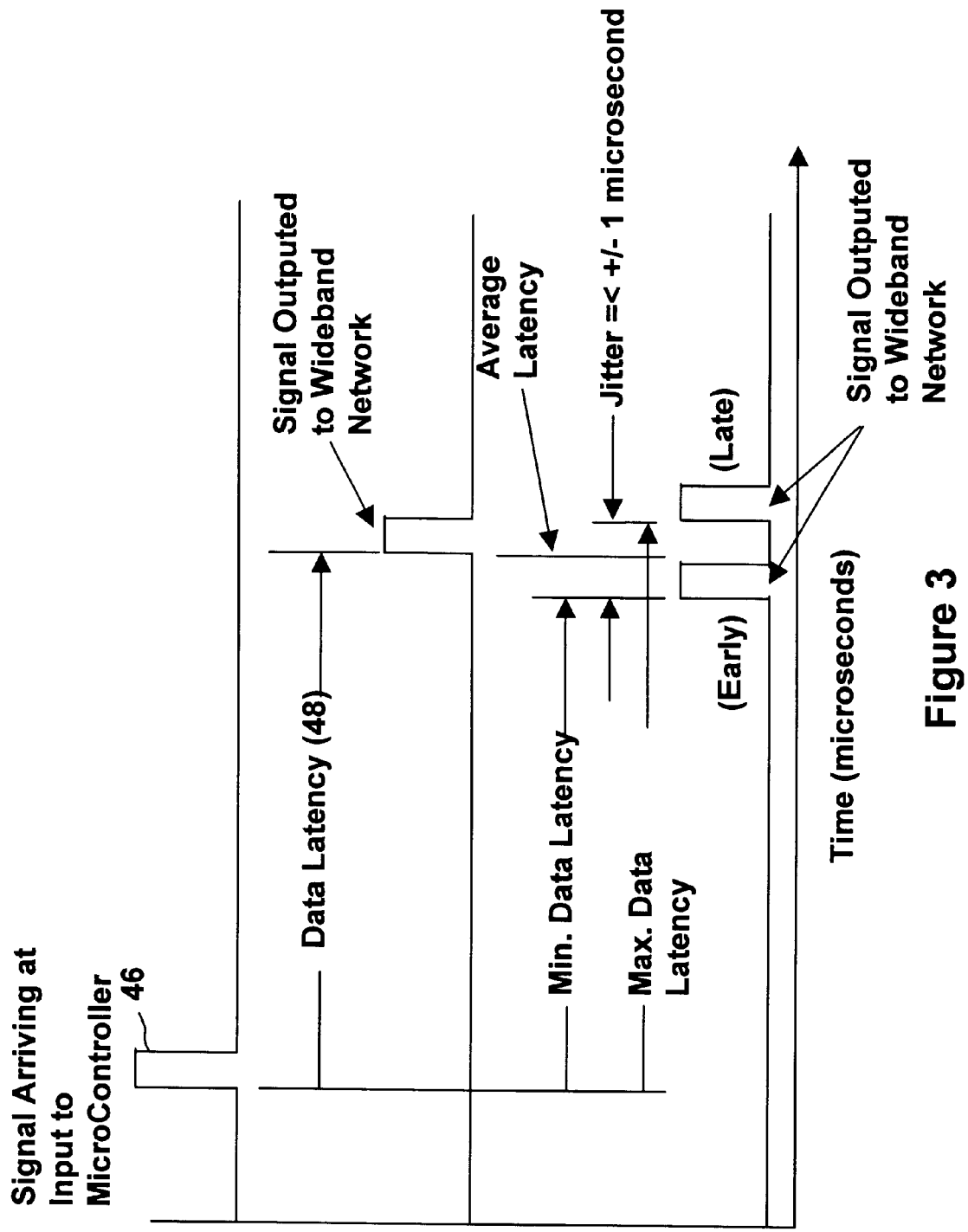
FIG. 3 is a time-history graph depicting an arriving signal, data latency and jitter in outputting the arriving signal to the wideband network.

Referring now to FIG. 3, a time-history graph is shown, depicting an arriving signal and the latency and jitter introduced in the process of outputting the arriving signal to the wideband network. The arriving signal is designated 46 in this figure. A representation of the length of time it takes to convert and package the arriving signal 46 and place it on the wideband network at the connector 16 (see FIG. 1), is labeled Data Latency 48. Low data latency is achieved by responding substantially immediately to an incoming legacy signal. This is accomplished by the controller element 24, which senses the arrival of the signal 28 and relays it substantially immediately to the link layer controller element 32. Once the data has arrived at the data controller element 32, the IEEE-1394 protocol defining the interface between the controller element 32 and the physical layer arbiter element 34 initiates arbitration for access to the bus. Once the arbitration status has been set to "request for access" the IEEE-1394 protocol provides for access to the bus in accordance with a fairness algorithm, which guarantees that each node has access to the bus at least once during each fairness interval. That fairness interval may be maintained at approximately 125 microseconds (i.e., 8000 accesses per second) per node by limiting the total amount of data transmitted by all nodes during the fairness interval to less than approximately 125 microseconds (i.e., 50,000 bits/125 microseconds), including data and packaging.

The variability of data latency, or jitter, may be controlled when desired for time synchronization objectives by software programming responsible for loading the data payload portion of the transmitted message. First, a fixed latency goal is established which is longer than the maximum access time for any node on the bus during an IEEE-1394 fairness interval. The software which is responsible for loading the data payload portion of the transmitted message fills the data payload portion of the transmitted message with "filler" data bits ahead of the desired synchronization bit to introduce the targeted amount of latency. The software then continually adjusts downward the quantity of filler bits until bus access is finally granted, and the message block is thereupon transmitted.

Obviously, many modifications and variations of the present invention are possible in light of the above teachings. It is, therefore, to be understood that, within the scope of the appended claims, the invention may be practiced otherwise than as specifically described.

What is claimed and desired to be secured by Letters Patent of the United States is:

1. An adapter/coupler for linking at least one legacy signal to a wideband network having a defined protocol, the wideband network having a signaling speed of 90 megabits per second or greater, the adapter/coupler, comprising:

(a) a signal conversion/conditioning element for receiving at least one legacy signal and providing a conditioned digital signal which is compatible to the defined protocol of the wideband network;

(b) a low latency controller element for receiving the conditioned digital signal and providing data/control signals; and (c) a link/physical layer element for receiving said data/control signals and transforming them to appropriate signaling mechanisms of a defined physical layer standard in accordance with said defined protocol, said transformed signals being outputted to said wideband network, wherein the latency from the reception of the conditioned digital signal from the signal conversion/conditioning element to the output of the transformed signals to the wideband network is less than 200 microseconds.

2. The adapter/coupler of claim 1, wherein wideband network signals are received by said link/physical layer element, the resulting data/control signals being passed to the low latency controller element and then conditioned by said signal conversion conditioning element for conversion to a legacy signal.

3. The adapter/coupler of claim 1, wherein said low latency controller element and said link/physical layer element consume an average of less than 750 milliwatts of power during operation.

4. The adapter/coupler of claim 1, wherein said low latency controller element comprises a jitter synchronization element for providing a variability of data latency of less than ±1 microsecond from the reception of the conditioned digital signal from the signal conversion/conditioning element to the output of the transformed signals to the wideband network.

5. An adapter/coupler for linking at least one legacy signal to a wideband network having a defined protocol, the wideband network having a signaling speed of 90 megabits per second or greater, the adapter/coupler, comprising:

(a) a signal conversion/conditioning element for receiving at least one legacy signal and providing a conditioned digital signal which is compatible to the defined protocol of the wideband network;

(b) a low latency controller element for receiving the conditioned digital signal and providing data/control signals; and (c) a link/physical layer element for receiving said data/control signals and transforming them to appropriate signaling mechanisms of a defined physical layer standard in accordance with said defined protocol, said transformed signals being outputted to said wideband network, wherein said low latency controller element and said link/physical layer element consume an average of less than 750 milliwatts of power during operation.

6. The adapter/coupler of claim 5, wherein wideband network signals are received by said link/physical layer element, the resulting data/control signals being passed to the controller element and then conditioned by said signal conversion/conditioning element for conversion to a legacy signal.

7. The adapter/coupler of claim 5, wherein said low latency controller element comprises a jitter synchronization element for providing a jitter of less than ±1 microsecond from the reception of the conditioned digital signal from the signal conversion/conditioning element to the output of the transformed signals to the wideband network.

8. The adapter/coupler of claim 1, wherein said link/physical layer element, comprises:
  (a) a link layer controller element for receiving said data/control signals and packaging the data to be transmitted into packets with appropriate destination, typing and error detection coding; and
  (b) a physical layer arbiter element connected to said link layer controller element for transmitting the packets in the form of said transformed signals to the wideband network after arbitrating for and successfully gaining access to the wideband network.

9. The adapter/coupler of claim 8, wherein wideband network signals are received by said physical layer arbiter element and transmitted to the link layer controller element for transmission to the low latency controller element.

10. The adapter/coupler of claim 9, wherein said link layer controller element and said physical layer arbiter element are galvanically isolated to prevent any significant current flow therebetween.

11. The adapter/coupler of claim 1, wherein said defined protocol of said wideband network comprises IEE-1394.

12. The adapter/coupler of claim 1, wherein said defined protocol of said wideband network comprises IEEE-1394a.

13. The adapter/coupler of claim 1, wherein said defined protocol of said wideband network comprises signaling rates up to 3.2 Gbps.

14. The adapter/coupler of claim 1, wherein said defined protocol of said wideband network comprises a fiber optic physical layer cabling media.

15. The adapter/coupler of claim 1, wherein said defined protocol of said wideband network comprises a cable length greater than 15 feet.

16. The adapter/coupler of claim 1, wherein said defined protocol of said wideband network comprises a bridging protocol and method for interfacing one IEEE-1394 class bus to another.

17. The adapter/coupler of claim 1, wherein said defined protocol of said wideband network comprises a fibre-channel protocol.

18. An adapter/coupler assembly, comprising:
  (a) an adapter/coupler for linking at least one legacy signal to a wideband network having a defined protocol, the wideband network having a signaling speed of 90 megabits per second or greater, the adapter/coupler, comprising:
    (i) a signal conversion/conditioning element for receiving at least one legacy signal and providing a conditioned digital signal which is compatible to the defined protocol of the wideband network;
    (ii) a low latency controller element for receiving the conditioned digital signal and providing data/control signals; and
    (iii) a link/physical layer element for receiving said data/control signals and transforming them to appropriate signaling mechanisms of a defined physical layer standard in accordance with said defined protocol, said transformed signals being outputted to said wideband network, wherein the latency from the reception of the conditioned digital signal from the signal conversion/conditioning element to the output of the transformed signals to the wideband network is less than 200 microseconds;
  (b) at least one legacy signal connector for connecting at least one legacy signal source to said signal conversion/conditioning element; and
  (c) at least one wideband network connector for connecting said link/physical layer element to the wideband network.

19. The adapter/coupler assembly of claim 8, further including a housing for containing said adapter coupler, said at least one legacy signal connector and said at least one wideband network connector.

* * * * *